Figure 1A:
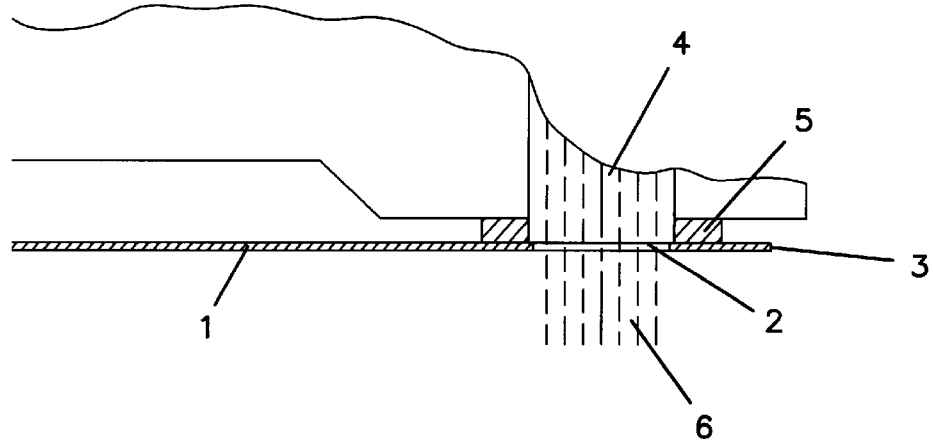

United States Patent [19]
Jensen

[11] Patent Number: 6,120,572
[45] Date of Patent: Sep. 19, 2000

[54] RING-SHAPED AIR DISTRIBUTION DISC AND AN AIR DISTRIBUTION DEVICE HAVING SUCH AN AIR DISTRIBUTION DISC

[75] Inventor: Arne Jensen, St. Fuglede, Denmark

[73] Assignee: Simatek A/S, Jerslev S., Denmark

[21] Appl. No.: 09/214,568

[22] PCT Filed: Jul. 7, 1997

[86] PCT No.: PCT/DK97/00301

§ 371 Date: Jan. 21, 1999

§ 102(e) Date: Jan. 21, 1999

[87] PCT Pub. No.: WO98/01210

PCT Pub. Date: Jan. 15, 1998

[30] Foreign Application Priority Data

Jul. 8, 1996 [DK] Denmark .............................. 9600239

[51] Int. Cl.⁷ .................................................. B01D 46/04
[52] U.S. Cl. .............................. 55/284; 55/287; 55/341.1
[58] Field of Search ......................... 55/284, 286, 341.1, 55/418, 419, 287; 96/427

[56] References Cited

U.S. PATENT DOCUMENTS

| 3,080,694 | 3/1963 | Smith . |
|---|---|---|
| 3,234,714 | 2/1966 | Rymer et al. . |
| 3,646,595 | 2/1972 | Williams . |
| 4,159,197 | 6/1979 | Schuler et al. . |
| 4,220,457 | 9/1980 | Fredriksen . |
| 4,247,310 | 1/1981 | Borst . |
| 4,433,986 | 2/1984 | Borst . |
| 4,553,986 | 3/1963 | Cilliberti et al. . |

FOREIGN PATENT DOCUMENTS 0 321 104   6/1989   European Pat. Off. .

*Primary Examiner*—David A. Simmons
*Assistant Examiner*—Fred Prince
*Attorney, Agent, or Firm*—Merchant and Gould P.C.

[57] ABSTRACT

A ring-shaped air distribution disc (11) for an air distribution device for providing rinsing air to an air cleaner provided with filter bags is provided. The ring-shaped air distribution disc (11) has a width that slightly exceeds the diameter (d) of at least one aperture (2) for rinsing air. In use the ring-shaped air distribution disc (11) is suspended in a free floating manner in the air distribution device, and is pressed against sealing means (5) of a number of rinsing air tubes (4) by springs (15) supported by a supporting plate (8) positioned underneath the ring-shaped air distribution disc (11).

7 Claims, 5 Drawing Sheets

RING-SHAPED AIR DISTRIBUTION DISC AND AN AIR DISTRIBUTION DEVICE HAVING SUCH AN AIR DISTRIBUTION DISC

The invention relates to an air distribution-disc for the distribution of rinsing air in an air cleaner provided with filter bags, and to an air distribution device has having such an air distribution disc.

An air distribution disc is used in for instance an air cleaner of the type disclosed in U.S. Pat. No. 4,220,457 showing a cyclone comprising a cylindrical housing with tangential entrance for dust-containing air. The lower end of the cylindrical housing of the cyclone is tapered is provided with a dust collector. The opposite upper end of the cylindrical housing is divided by an intermediary wall into a lower dust-containing chamber and an upper dust-free chamber. Filter bags are suspended from the intermediary wall extending into the dust-containing chamber, the filter bags being closed at their lower ends and open at their upper ends.

In use the dust-containing air enters the cyclone via the tangential entrance and large particles are separated off in the cyclone. Smaller dust particles flow upwards with the air in the dust-containing chamber. The dust-containing air enters the filter bags from the outside causing the dust to deposit on the filter bags. The now cleaned air flows further upwards within the filter bags into the dust-free chamber and leaves the air cleaner via an outlet for clean air provided in the dust-free chamber.

After some time of filtering the filter bags may have a rather large amount of dust deposited on their outer surfaces. In order to remove the deposited dust, rinsing air is blown through the filter bags in countercurrent, i.e. from the dust-free chamber to the dust-containing chamber through the filter bags.

U.S. Pat. No. 4,220,457 discloses an arrangement for controlling the blowing of rinsing air in such a way that the filter bags are alternately rinsed during operation. The arrangement comprises a plane, disc-shaped air distribution disc having two diametrically opposite apertures. The air distribution disc is positioned over the upper ends of the filter bags, and the two apertures in the air distribution disc are arranged such that they alternately, by rotation of the air distribution disc, is aligned with the filter bags. Above the air distribution disc, tubes for rinsing air is provided, one tubing for each filter bag. The tubes are connected to a device for compressed air.

In use the air distribution disc is rotated slowly, causing filter bags to be rinsed by compressed air in countercurrent each time the apertures of the air distribution disc are aligned with the rinsing air tubes and the filter bags.

The air distribution disc should be in sealing engagement with the rinsing air tubes in order to prevent any leakage of rinsing air when the tubes are not aligned with the apertures of the air distribution disc. In use, however, practice has shown that the sealing engagement is hard to maintain due to the friction between the air distribution disc and the sealing surface of the tubes. In fact, the friction between the air distribution disc and the sealing surface of the tubes provokes the air distribution disc to expand, especially in the area around the apertures, butt since the air distribution disc is an almost closed disc, the outer area of the air distribution disc tends to bend out of the plane of the air distribution disc, causing a gap to arise between the air distribution disc and the sealing surface of the rinsing air tubes. A large amount of rinsing air may be lost because of this gap. This problem is even worse when hot air is rinsed, due to the high temperatures.

A solution to this problem has been to provide a rigid supporting plate underneath the air distribution disc, supporting the air distribution disc by rubber supports between the supporting plate and the air distribution disc, trying to force the air distribution disc not to bend out. This solution has the disadvantage that when the sealing means of the rinsing air tubes are worn, the same problem as described above reappears. Further, the rubber supports are not suitable when rinsing hot air.

Another solution is to reduce the diameter of the apertures, causing lesser expansion of the air distribution disc but requiring higher rinsing air pressure.

It is an object of the present invention to provide air distribution disc that does not suffer from the disadvantages mentioned above and an improved air distribution device having such an air distribution disc.

According to the invention this is achieved by arranging the air distribution disc as stated in claim 1 and by arranging the air distribution device as stated in claim 4.

By shaping the air distribution disc as a ring having a width that is slightly larger than the diameter of the at least one aperture, a compliant air distribution disc is provided. This has the advantage that it does not tend to bend out of its plane when stressed, since it can expand more freely than is the case with an almost closed disc according to the prior art. The sealing between the ring-shaped shaped air distribution disc and the sealing means of the rinsing air tubes can therefore be more securely maintained.

Furthermore, the apertures may have a rather large diameter, whereby low pressure rinsing air may be utilised.

In use the ring-shaped air distribution disc is preferably free floating in order to maintain its compliance stresses. This is achieved by supporting the ring-shaped air distribution disc in a central support having an annular groove in which the ring-shaped air distribution disc is suspended in a free floating manner. Preferably the central hole of the ring-shaped air distribution disc is provided with notches which are engagable with supporting means provided in the annular groove of the central support.

In order to seal the ring-shaped air distribution disc against the sealing means of the rinsing air tubes, a supporting plate is provided underneath the ring-shaped air distribution disc, said supporting plate being provided with springs for pressing the ring-shaped air distribution disc against the sealing means of the rinsing air tubes.

The free floating air distribution disc and the use of springs for pressing the air distribution disc against the sealing means of the rinsing air tubes further ensures that the ring-shaped air distribution disc and the sealing means of the rinsing air tubes are in sealing contact even when the sealing means of the rinsing air tubes becomes worn.

Preferably the ring-shaped air distribution disc is made of steel, but other materials may be used as well.

Figure 1B:
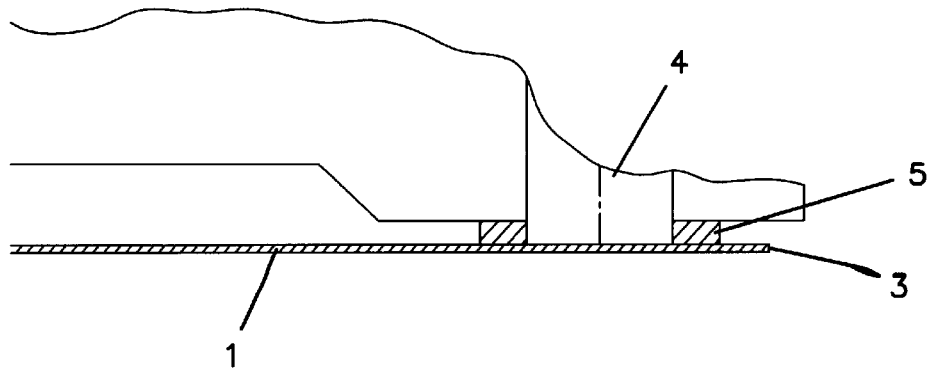
Figure 2A:
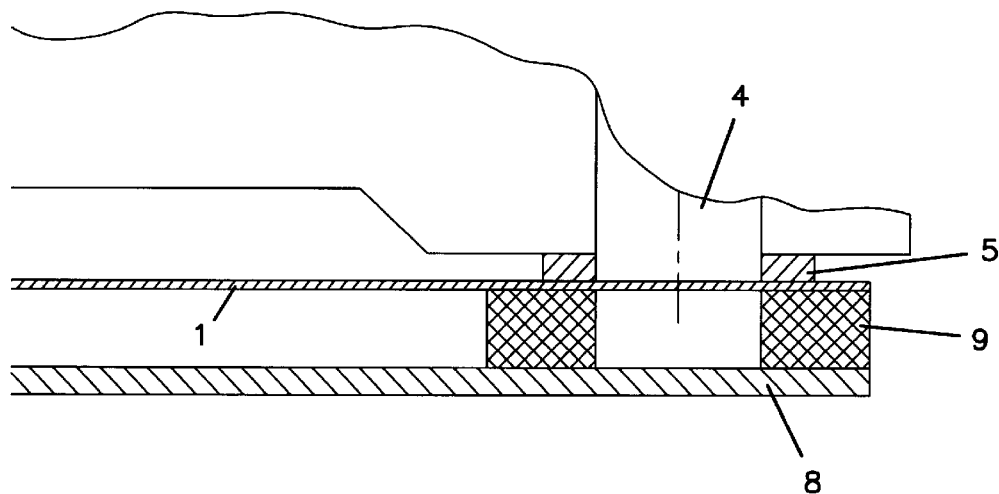
Figure 2B:
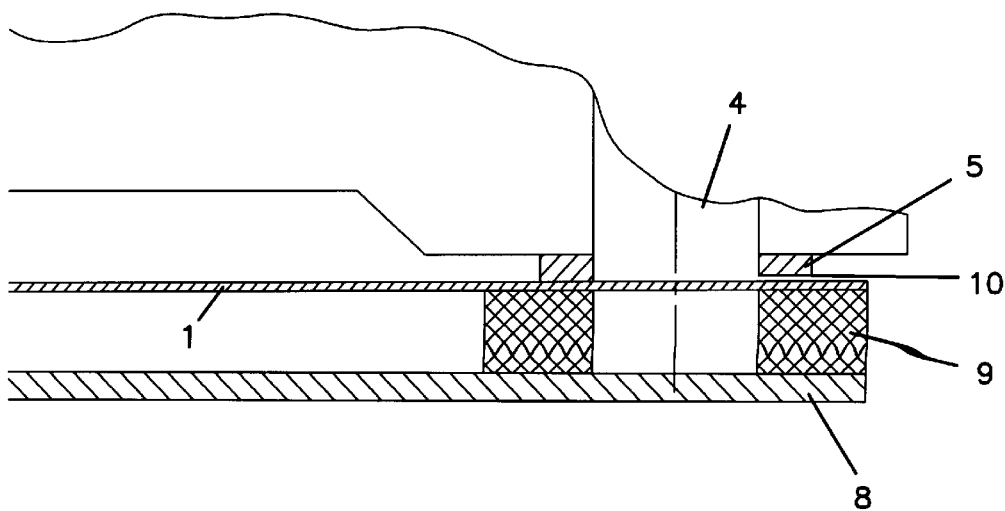
Figure 3A:
Figure 3B:
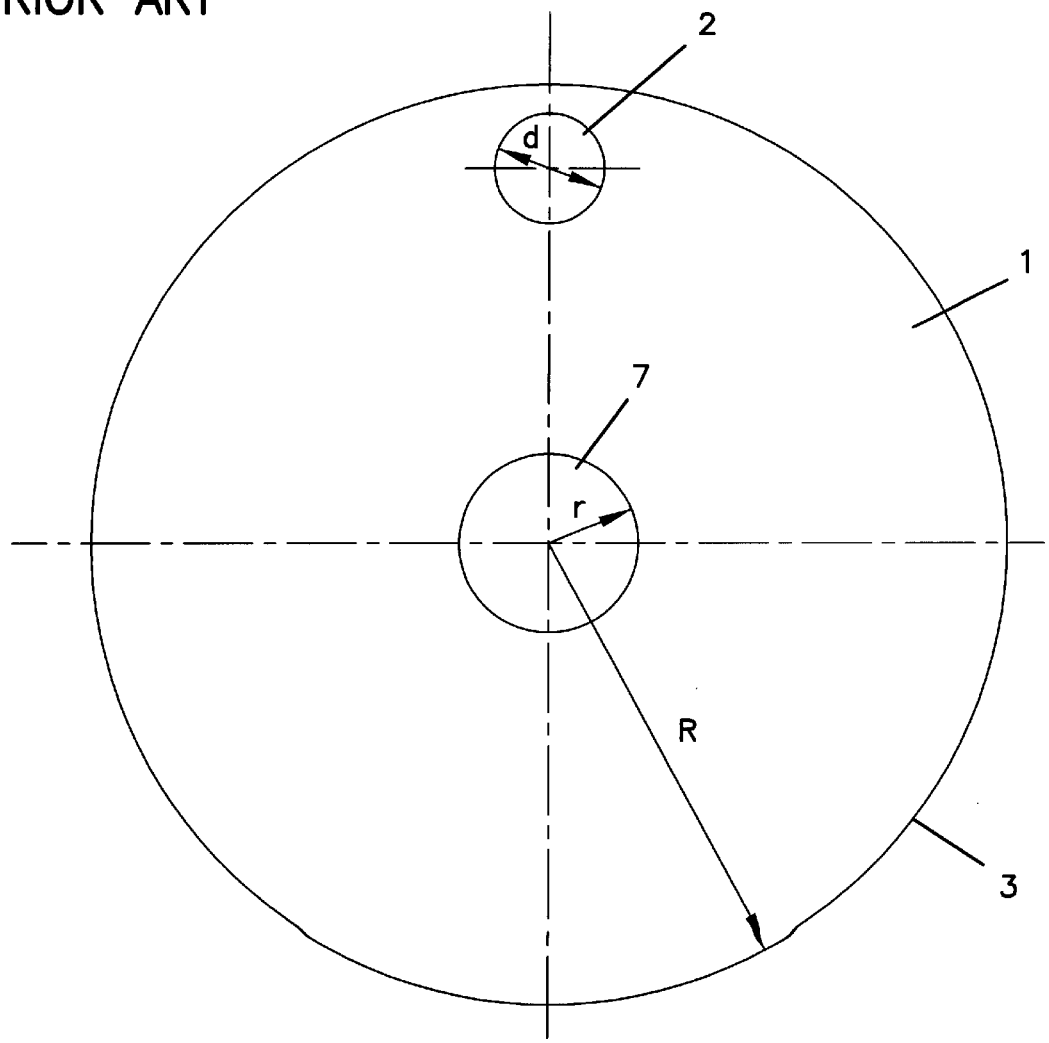
Figure 4A:
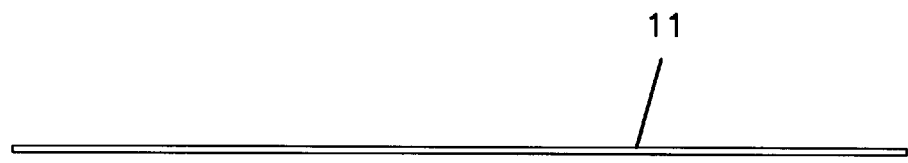
Figure 4B:
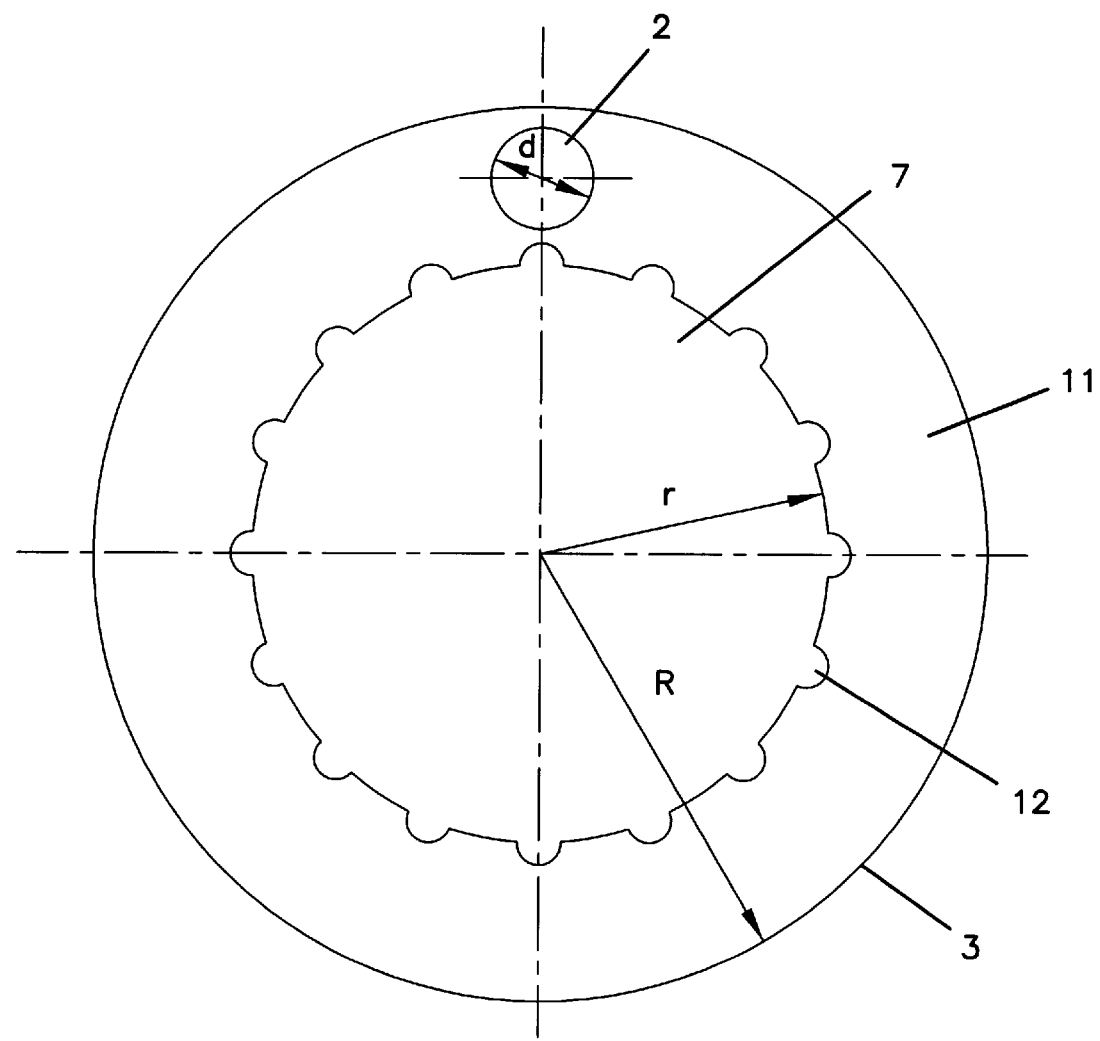
Figure 5:
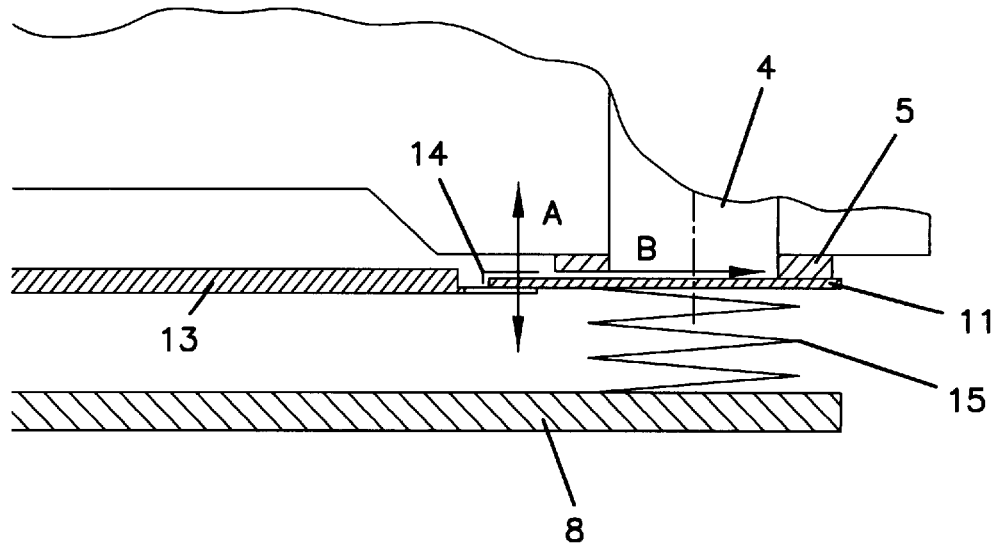

The invention will now be discussed in further detail with reference to the accompanying drawings in which FIG. 1a shows a part of an air distribution device according to the prior art with the air distribution disc in its closed position, FIG. 1b shows the same as FIG. 1a with the air distribution disc in its opened position, FIG. 2a shows a part of another air distribution device according to the prior art with the air distribution disc in its closed position, FIG. 2b shows the same as FIG. 2a with a stressed distribution disc, FIG. 3a is a side view of a stressed air distribution disc according to the prior art, FIG. 3b shows a top plan view of an air distribution disc according to the prior art, FIG. 4a is a side view of an air distribution di t, according to the present invention, FIG 4b shows a top plan view of an air distribution disc according to the present invention, and FIG. 5 shows a part of an air distribution device provided with an air distribution disc according to the present invention in its closed position.

FIG. 1a shows a part of an air distribution devices according to prior art with an air distribution disc 1 provided with an aperture 2 near the outer edge 3. Above the air distribution disc 1, a rinsing air tube 4 is shown, the rinsing air tube having a sealing means 5, preferably made of rubber, which is during operation pressed against the air distribution disc 1. A flow of rinsing air 6 is indicated by the dotted lines.

Normally the air cleaner is provided with a large number of filter bags, e.g. up to 300, and a corresponding number of rinsing air tubes 4 may be aligned with the filter bags. Alternatively, the air distribution device is constructed as a rotatable unit having only a few, e.g. 7–10, rinsing air tubes 4, which, during rotation of the air distribution device, are alternately aligned with the same number of filter bags. In the Figures, however, only single rinsing air tube 4 is shown for illustrating the functionality of the air distribution disc 1.

The air distribution disc 1 is circular as shown in FIG. 3b with an outer radius R and is provided with a central hole 7 with a radius r. The aperture 2 arranged near the outer edge 3 has a diameter d corresponding to the diameter of the rinsing air tube 4.

The air distribution device in FIG. 1a is shown in its opened position, i.e. rinsing air 6 is flowing through >s aperture 2 and further into a filter bag (not shown) positioned underneath the air distribution disc 1 for rinsing the filter bag with air in countercurrent.

FIG. 1b shows the same air distribution device as FIG. 1a, but in its closed position, since the air distribution disc 1 is rotated such that the aperture 2 is no longer aligned with the rinsing air tube 4.

Due to the friction between the air distribution disc 1 and the sealing means 5 of the rinsing air tubes 4, the air distribution disc 1 tends to bend out of its plane and assume the shape shown in FIG. 3a, thereby increasing the risk of leakage between the air distribution disc 1 and the rinsing air tubes 4.

In order to minimise this risk, a thick supporting plate 8 may be provided underneath the thin air distribution disc 1 as shown in FIG. 2a. This also known in the prior art.

The supporting plate 8 is provided with elastic rubber supports 9 in order to force the air distribution disc 1 into sealing engagement with the sealing means 5 of the rinsing air tubes 4. In order to further minimise the risk of air leakage, the diameter of the rinsing air tubes 4 may be reduced and the air pressure increased.

Despite of this improved air distribution device, leakage may occur especially when hot dust-containing air is to be cleaned. The higher the temperature, the greater the risk that the air distribution disc 1 bends out of its plane and compresses the elastic rubber supports 9 as shown in FIG. 2b, creating a small gap 10 between the air distribution disc 1 and the sealing means 5 of the rinsing air tube 4.

Besides, the elastic rubber supports 9 are not suitable for use in high temperature conditions.

A ring-shaped air distribution disc 11 according to the invention is shown in FIGS. 4a and 4b. FIG. 4a shows the ring-shaped air distribution disc 11 from the side, and it can be seen that the ring-shaped air distribution disc 11 consists of a thin, planar disc, preferably made of steel.

In FIG. 4b the ring-shaped air distribution disc 11 is shown in a top plan view. The ring-shaped air distribution disc 11 has an outer radius R, an inner central hole 7 with a radius r and an aperture 2 with a diameter d. The aperture 2 is positioned midways in the ring defined by the outer radius R and the inner radius r, leaving only a slim piece of material between the aperture 2 and the outer edge 3 and between the aperture 2 and the central hole 7.

Since the air distribution disc 11 is ring-shaped it does not tend to bend out to the same degree as a disc-shaped air distribution disc 1. This is due to the fact that the ring-shaped air distribution disc 11 is more compliant to stresses while maintaining its planar shape than an almost closed air distribution disc. In other words, the ring-shaped air distribution disc 11 expands more freely outwards, having no need for bending out of the plane.

The notches 12 in the central hole 7 are used when mounting the ring-shaped air distribution disc 11 in the air distribution device.

FIG. 5 shows the ring-shaped air distribution disc 11 mounted in an air distribution device in its closed position.

The air distribution device again comprises a rinsing air tube 4 with sealing means 5 which seals the rinsing air tube 4 against the ring-shaped air distribution disc 11. The air distribution device further comprises a central support 13 for the ring-shaped air distribution disc 11, said central support 13 having an annular groove 14 at its outer edge. The ring-shaped air distribution disc 11 is arranged free floating in the annular groove 14, unless for engaging means (not shown) in the annular groove 14, engaging the notches 12 of the ring-shaped air distribution disc 11. The double arrows A and B indicate the free floating directions of the ring-shaped air distribution disc 11.

In order to press the ring-shaped air distribution disc 11 against the sealing means 5 of the rinsing air tube 4, a supporting plate 8 is arranged underneath the ring-shaped air distribution disc 11 and springs 15 are arranged between the supporting plate 8 and the ring-shaped air distribution disc 11. By using springs 15 instead of rubber supports 9, an air distribution device which is more suitable for rinsing hot air is provided.

What is claimed is:

1. An air distribution disc (11) for an air distribution device for providing rinsing air to an air cleaner provided with filter bags, said air distribution disc (11) consisting of a rotatable, substantially circular, plate having an outer edge (3) with an outer radius (R) and a substantially circular inner central hole (7) with an inner radius (r), at least one aperture (2) having a diameter (d) being provided near the outer edge (3) between the outer edge (3) and the inner central hole (7), characterized in that the difference between the outer radius (R) and the inner radius (r) slightly exceeds the diameter (d) of the at least one aperture (2).

2. An air distribution disc according to claim 1, characterized in that the inner central hole (7) is provided with notches (12).

3. An air distribution disc according to claim 1, characterized in that it is made of steel.

4. An air distribution device for providing rinsing air to an air cleaner provided with filter bags, said air distribution device comprising a air distribution disc (11) consisting of a substantially circular, plate having an outer edge (3) with an outer radius (R) and a substantially circular inner central hole (7) with an inner radius (r), at least one aperture (2) having a diameter (d) being provided near the outer edge (3) between the outer edge (3) and the inner central hole (7), a central support (13) for the air distribution disc (11), and at least one rinsing air tube (4), said rinsing air tube (4) being provided with sealing means (5), sealing the rinsing air tube (4) against the air distribution disc (11), characterized in that the difference between the outer radius (R) and the inner radius (r) of the air distribution disc (11) slightly exceeds the diameter (d) of the at least one aperture (2) in the air distribution disc (11), that the air distribution disc (11) is suspended in a free floating manner in the central support (13), and that a supporting plate (8) provided with at least one spring (15) for pressing the air distribution disc (11) against the sealing tube (4) is arranged underneath the air distribution disc (11).

5. An air distribution device according to claim 4, characterized in that the central support (13) is provided with an annular groove (14) in which the air distribution disc (11) is suspended in a free floating manner.

6. An air distribution device according to claim 5, characterized in that the inner central hole (7) of the air distribution disc (11) is provided with notches (12) that co-operate with engaging means in the annuls. groove (14).

7. An air distribution device according to claim 4, characterized in that the air distribution disc (11) is made of steel.

* * * * *